United States Patent [19]

Kouhi

[11] Patent Number: 5,684,294
[45] Date of Patent: Nov. 4, 1997

[54] PROXIMITY AND AMBIENT LIGHT MONITOR

[76] Inventor: Ross George Kouhi, 305-420 Lewis Street, Ottawa, Ontario, Canada, K2P 0S9

[21] Appl. No.: 730,831

[22] Filed: Oct. 17, 1996

[51] Int. Cl.⁶ .................................................. H01J 40/14
[52] U.S. Cl. ................................ 250/214 AL; 250/221
[58] Field of Search .......................... 250/221, 214 B, 250/214 AL, 214 AG; 307/64–66; 359/154, 172; 340/555–557; 128/664–666

[56] References Cited

U.S. PATENT DOCUMENTS

| | | | |
|---|---|---|---|
| 4,735,357 | 4/1988 | Gregory et al. | 236/93 |
| 4,977,351 | 12/1990 | Bavaro et al. | 307/66 |
| 5,010,566 | 4/1991 | Seo | 379/61 |
| 5,224,151 | 6/1993 | Bowen et al. | 379/58 |
| 5,398,680 | 3/1995 | Polson et al. | 128/666 |

Primary Examiner—Que Le
Attorney, Agent, or Firm—Aprilia U. Diaconescu

[57] ABSTRACT

A proximity detector and ambient light monitor (PALM) is provided, comprising a light source for generating an optical composite signal, a light detector for providing a detected signal, a circuit for separating the ac component from the detected signal, and a switch for providing a control signal when the ac component is outside a preset range. The PALM further comprises an ambient light detector which also receives the detected signal and provides an ambient light level signal. The ambient light detection circuit rejects the signals that relate to the proximity monitoring and provides sufficient gain to overcome daylight filtering lens currently provided on the light detectors. The ambient light monitoring circuit provides either a continuous varying voltage proportional to the ambient light, or a simple binary signal indicating that the light is above a threshold.

20 Claims, 3 Drawing Sheets

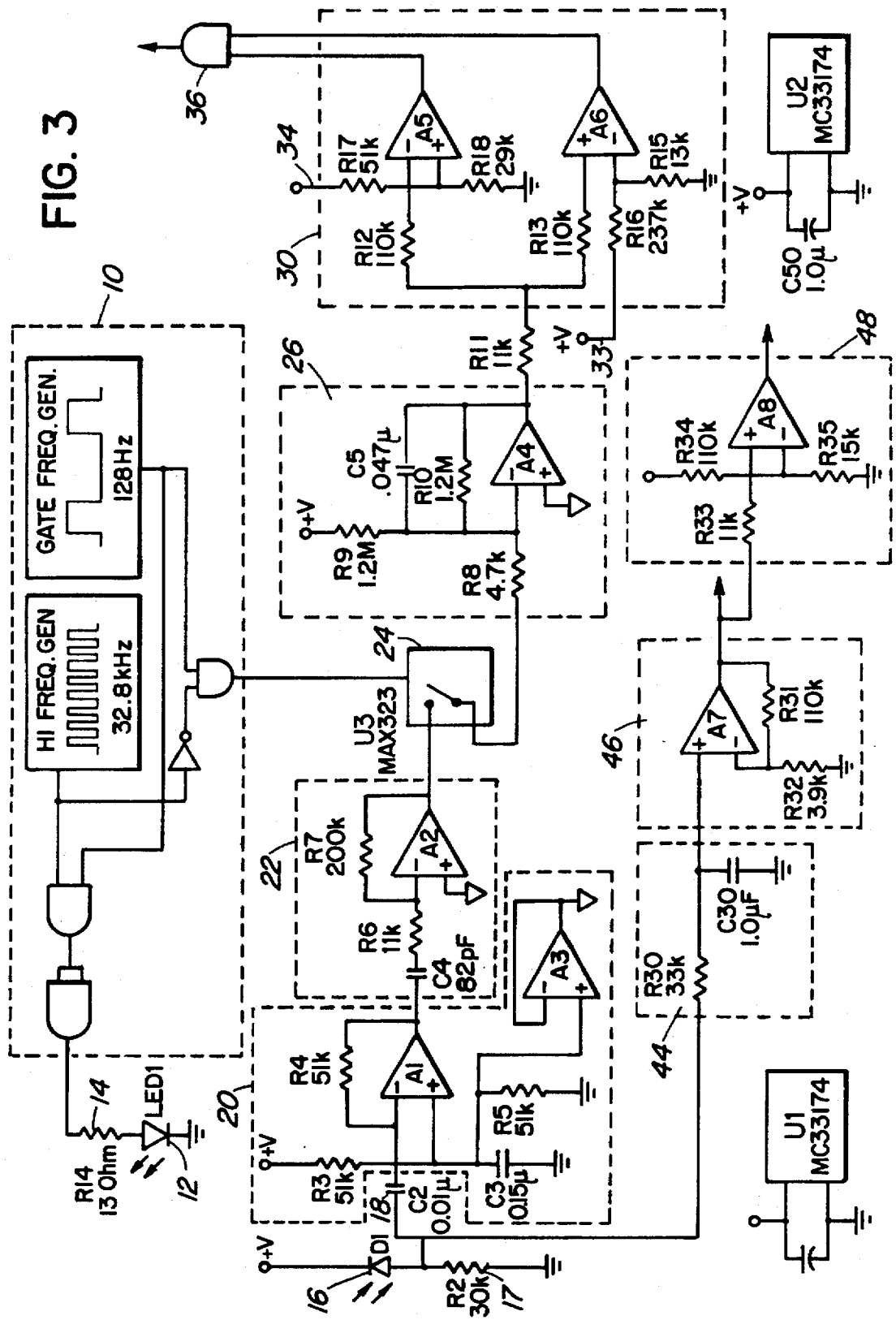

PROXIMITY AND AMBIENT LIGHT MONITOR

BACKGROUND OF THE INVENTION

1. Field of the Invention

This invention is directed to a proximity and ambient light monitor (PALM) and in particular to PALM for a personal communication terminal.

2. Background Art

Modern personal communication terminals are designed to support a plurality of services, such as voice mail, answering services, etc. Portable communication terminals have a receiver, a transmitter, a dial-pad, and in many cases a display. When the terminal is used in the loudspeaker, or handsfree mode, a broadcast capability allows the user to look and interact with the display, while on an active call, and also allows a plurality of listeners to receive same communication. In the conventional receiver or handset mode, the terminal is held against the user's ear.

Generally, selection between the receiver and loudspeaker modes is made manually by use of a switch provided on the terminal. In some cases, a terminal is provided with a proximity detector for determining the mode of use according to the presence or absence of a human body or object in the vicinity of the receiver. The signal from the proximity detector is then used to switch between the loudspeaker and handset modes of operation, accordingly increasing/decreasing the volume of the loudspeaker, to turn the display on/off, etc.

User activated proximity detector/switches are also used for example in conjunction with automatic water supply systems. Thus, U.S. Pat. No. 4,735,357 (Gregory et al., issued Apr. 5, 1988) discloses a water faucet with an automatic control system which dispenses water upon sensing of a hand or an object near the outlet of the spout, using infrared light.

It is also known to use an ambient light for controlling whether the environment is dim enough to warrant use of a display back lighting. U.S. Pat. No. 5,224,151 (Bowen et al., issued Jun. 29, 1993 and assigned to AT&T Bell Laboratories) discloses a handset with an infrared proximity detector activated when the distance between the receiver and the user's ear is less than a preset value, at which the operation of the terminal is switched from loudspeaker mode to receiver mode. The terminal disclosed in this patent comprises two infrared emitting devices arranged in a spatial relationship. The light is generated by each LED in alternative periods and is then focused by an associated lens. The light emitted by the first LED is directed outwardly and is modulated at an rf frequency to produce a pulsed infrared output, which is readily distinguishable from any incidental background light by a distance measuring circuit. The light reflected from the user is focused by another lens and is detected by a photodiode, which also receives direct light from the second LED. The second LED is used for a check of operability of the ranging function of the handset to prevent operation of the portable communication device in the loudspeaker mode upon failure of one of the infrared LEDs or the detector.

However, the circuit disclosed in the above US Patent is complex, requires the use of a microcomputer provided with firmware, and also uses a complex light emitting scheme, requiring a complicated physical placement of the IR components. This results in a large power consumption, inherent firmware failures, and slow decision times.

There is a need for equipping a personal communication terminal with a PALM for providing fast, reliable and accurate proximity activated switching between the loudspeaker and receiver modes of operation of the terminal and power savings through intelligent control of back lighting.

SUMMARY OF THE INVENTION

It is an object of the present invention to provide PALM which overcomes totally or in part the drawbacks of the prior art circuits.

It is another object of the invention to provide a personal communication terminal with a PALM which automatically switches the mode of operation of the terminal between a loudspeaker mode and a receiver mode in response to a movement of the terminal towards the user.

Still another object of the invention is to provide a PALM which uses a photodiode in two modes simultaneously, namely in a proximity detection mode, and in an ambient light detection mode, where ambient light detection mode provides intelligent control of display back lighting. The proximity detector part of the circuit is capacitively coupled to the detector, and the ambient light monitor is resistively coupled to the detector.

According to a first aspect of the invention, there is provided a proximity and ambient light monitor (PALM) comprising light emitting means for generating an optical composite signal; light detecting means for receiving a fraction of the optical composite signal and providing a detected signal; means for separating an ac component from the detected signal, the ac component representing a fraction of the optical composite signal; and switching means for providing a control signal when the ac component is outside a preset range.

In accordance with another aspect of the invention, there is provided a method for detecting proximity and ambient light intensity, comprising the steps of generating an optical composite signal; receiving a fraction of the optical composite signal and providing a detected signal; separating an ac component from the detected signal, the ac component representing a fraction of the optical composite signal; and providing a control signal when the ac component is outside a preset range.

An advantage of the present invention is that it uses a simple, standalone design which provides the necessary reliability at a low cost. The proximity detector section of the device requires only one infrared (IR) emitter, reducing complexity, failure modes, power consumption, and cost. No microcontroller involvement is required, and therefore no firmware development and inherent firmware failures or problems, conducting to a safer operation. As well, decision from the circuit does not use CPU real-time, is implemented in hardware for quick response, and does not depend on software decision making.

Gradual audio ramping may be obtained for the transition between the two modes of operation, rather than hard switching.

Integrated ambient light measurement without an additional IR photodiode saves parts and allows to integrate the ambient light and proximity functions in the same circuit. With addition of simple logical gates, a backlight for a display could be controlled to be activated only when the room is dimly lit, and the user's head is not near the phone.

In a preferred embodiment of the invention, the personal communication device is a telephone handset, such as a portable wireless terminal for a personal communication system.

BRIEF DESCRIPTION OF THE DRAWINGS

The foregoing and other objects, features and advantages of the invention will be apparent from the following more particular description of the preferred embodiments, as illustrated in the appended drawings, where:

FIG. 3 is a circuit schematics of PALM; and

DESCRIPTION OF THE PREFERRED EMBODIMENT

Figure 1A:
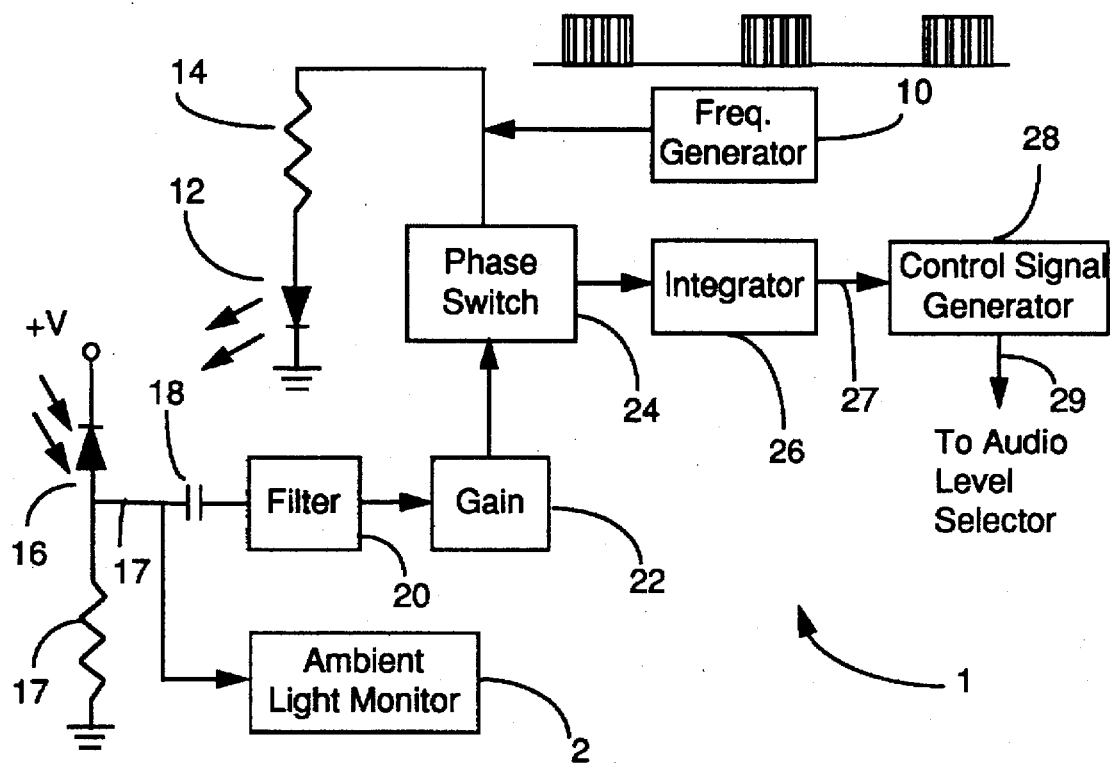
FIG. 1A illustrates a block diagram of the proximity light detector according to the invention.

FIG. 1 illustrates the block diagram of a proximity detector according to an exemplary embodiment of the invention. A frequency generator 10 provides a pulse signal composite of high and low frequencies. The combination being preferably used is on the order of 40 kHz to 90 Hz. Also an implementation of 32 kHz and 128 Hz may take advantage of the existing circuits on the application specific integrated circuit (ASIC) present on the terminal. An infrared light emitting diode (LED) 12 is reverse biased with the anode connected to a series resistor 14 and the collector connected to the ground. The composite signal is applied to LED 12, which emits an optical composite signal corresponding to the composite electrical signal. The benefit of a composite signal of a high frequency and a low frequency is that LED 12 is not transmitting continuously. With a gating frequency component of around 100 Hz and on a time of microseconds, the 40 kHz burst is transmitted rarely (about each 10 ms), saving power and extending the lifetime of the LED.

The optical composite signal is detected by photodiode 16 and converted into a detected signal 17. LED 12 and photodiode 16 are placed such that the optical signal emitted by LED 12 arrives at photodiode 16 only if it is reflected by an obstacle in the path of the light. Such an obstacle is, for example, the head of a telephone user when the terminal is a handset. In this way, a mode switch is obtained, which acknowledges the location of the handset proximal or far away from the user's ear.

A capacitor 18 separates the AC and DC components of the detected composite signal. Thus, the AC component, proportional to the reflected fraction of the composite signal generated by generator 10, passes through capacitor 18, while the DC component, mainly produced by the ambient light, is rejected on the path through ambient light monitor 2. The AC component is applied to a filter 20 to remove signals below the low frequency, which include the AC signal received from electric lights. The filtered signal is amplified by a simple gain stage 22 and input to a phase switch 24. Phase switch 24 is a simple analog switch which is activated by the composite signal generated by frequency generator 10. This eliminates the effects of random AC noise, since the noise would not be in phase with the periodic composite signal, and also effectively rectifies the AC component.

The output from phase switch 24 is integrated to provide a varying voltage level, which is indicative of the amount of the reflected IR light. Integrator 26 may be a conventional integrating RC circuit. The voltage level 27 obtained at output of integrator 26 is applied to a control signal generator 28, which evaluates the voltage magnitude of signal 27 and generates a control signal 29 used to control the audio level selector (not shown). The control signal 29 may be used, for example, to adjust the gain of an audio amplifier. When an important fraction of the optical composite signal is reflected towards photodiode 16, the AC component is high and accordingly, the audio level controller will decrease the volume of the speaker(s). This takes place when the handset is close to the user's ear. Alternatively, when only a small fraction of the optical composite signal is detected by photodiode 16, the AC component is low, stage 28 will increase the volume of the speaker(s), in the handsfree (loudspeaker) mode.

Figure 1B:
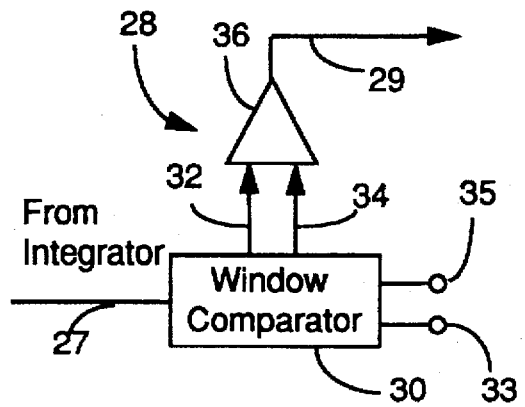
FIG. 1B is a block diagram of one embodiment of the control signal generator of FIG. 1A.
Figure 1C:
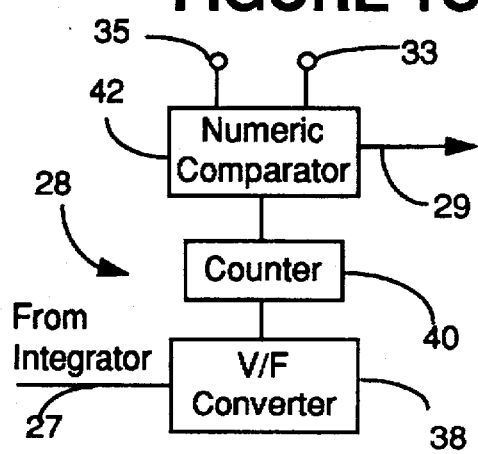
FIG. 1C is a block diagram of another embodiment of the control signal generator of FIG. 1A.

Two options are disclosed herein for the control signal generator 28, and they are illustrated in FIGS. 1B and 1C, respectively.

FIG. 1B shows a window comparator 30 that outputs two signals 32 and 34. Signal 32 is the result of a comparison of the voltage level 27 received from integrator 26 with a low voltage applied on input 33; signal 34 is the result of a comparison of the voltage level 27 with a high voltage applied on input 35. An AND circuit 36 provides an output that effectively indicates when the voltage level is greater than the low voltage, and is less than the high voltage. This result condition allows the audio circuit to produce a loud, handsfree sound level, that would cause pain or injury if it were broadcast into one's ear directly.

Being close to the detector provides a higher reflected fraction and thus a higher voltage level 27 at the output of integrator 26. In this case, the voltage level becomes higher than the high voltage and the AND condition is terminated. As indicted above, the sound level is adjusted and the handsfree mode of operation is operational.

A broken light emitting element or a broken detecting element causes the voltage level to be less than the low voltage, again ending the AND condition and the handsfree mode of operation is terminated.

AND logical function 36 and frequency generator 10 are generally available on most of ASIC devices.

FIG. 1C shows another variant of the control signal generator 28, based on a voltage-to-frequency (V/F) converter 38. The output of V/F converter 38 is a stream of pulses of a rate proportional to the magnitude of the voltage level obtained at the output of integrator 26. A counter 40 evaluates the pulse rate which is applied to a numeric comparator 42. Numeric comparator 42 receives a low voltage on input 26 and a high voltage on input 35 and determines the conditions described in connection with the embodiment of FIG. 1B.

The counter and numeric comparison functions are circuits typically simple to implement on ASIC devices. In the presence of a microprocessor or an appropriate ASIC, the comparison may be effected using software or wired thresholds. The added benefit of this approach is that a graduated signal is available at the output of the level controller 28, to ramp the audio level down or up as desired, for a more pleasant change in volume.

Figure 2:
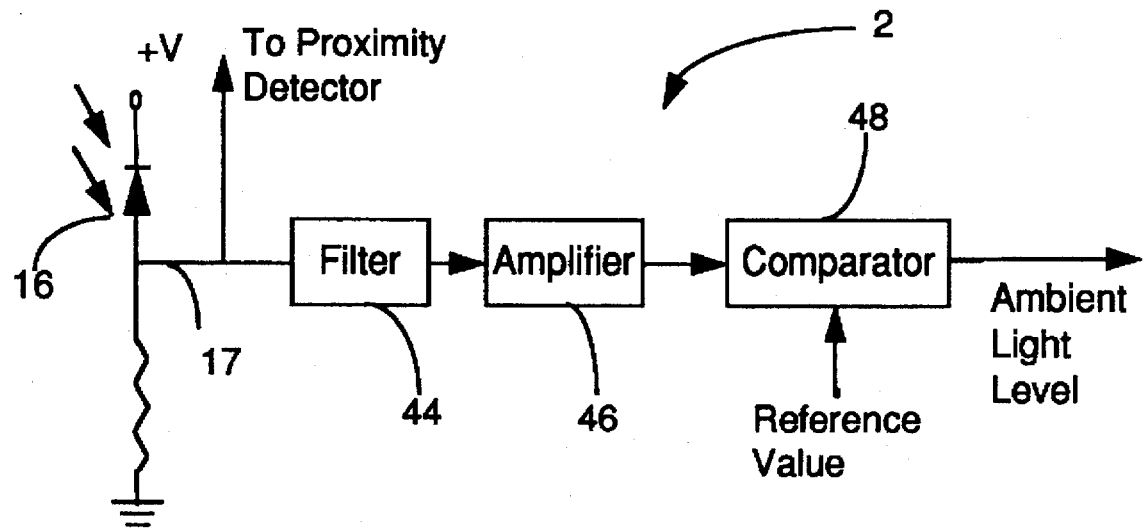
FIG. 2 is a block diagram of the ambient light monitor circuit.

FIG. 2 is a block diagram of the ambient light monitor circuit illustrated in FIG. 1A and referred with numeral 2. The ambient light detector requires two features and provides for an optional feature that allows additional usage modes. The ambient light monitor circuit should reject the signals that relate to the proximity detector, and also it must provide sufficient gain to overcome daylight filtering lens generally provided on the photodiode 16. The additional feature mentioned above is the provision of the circuit ability to provide either a continuous varying voltage proportional to the ambient light around the PIN photodiode, or a simply binary signal indicating that the light level is above some level as selected by a voltage divider on the ground reference of an operational amplifier or a comparator device.

The ambient light monitor 2 receives the detected signal 17, comprising both the AC and DC component. This signal is filtered with a simple RC filter 44, which has a cut-off frequency f=RC. The values of R and C are selected such that frequencies of 50 Hz or more are attenuated. This filter effectively eliminates noise from AC powered lights and the signals being received by the photodiode 16 for the purpose of proximity detection.

The filtered signal is next amplified in amplifier 46 to provide on sufficient gain to produce a voltage varying signal proportional to the brightness of ambient light impinging on the photodiode 16 and not filtered out by any daylight filtering coating or lenses that may, or may not, be provided on the photodiode 16. A typical level of gain is 30x to 50x. The gain stage 46 is preferably a simple non-inverting operational amplifier.

The amplified signal is provided to a comparator 48, together with a reference value, which represents the voltage which must be surpassed for the comparator to produce a high output. The transition from low to high at the output of comparator 48 may be used as decision making criteria by other circuits. For example, a backlit liquid crystal display (LCD) may be turned on/off by this signal. Comparator 48 may be an operational amplifier used in a comparator configuration. The reference value will then be a voltage set with a simple resistor divider circuit.

When filter 44 is used to eliminate only the proximity detector related pulses, but keep the remaining AC light signal, and the reference value is appropriately selected, the ambient light level output by comparator 48 will indicate if the user is indoor or outdoor. The ambient light level can be then used to a microcomputer for further deciding whether to use a cellular radio connection protocol for a call as opposed to a local area indoor cordless protocol, which could be less expensive if such dual mode or multi-mode telephone were in use.

FIG. 3 is an electrical schematics of PALM, showing the preferred embodiment for various blocks. In addition, by simple addition of resistors to provide positive feedback on appropriate amplifiers, a more stable receiver and transmitter modes may be obtained. This will avoid a case when the user holds the unit at threshold distance where the display is unstable and flickering between states. Such a hysteresis feature may be provided on both the proximity detector and ambient light monitor.

Figure 4:
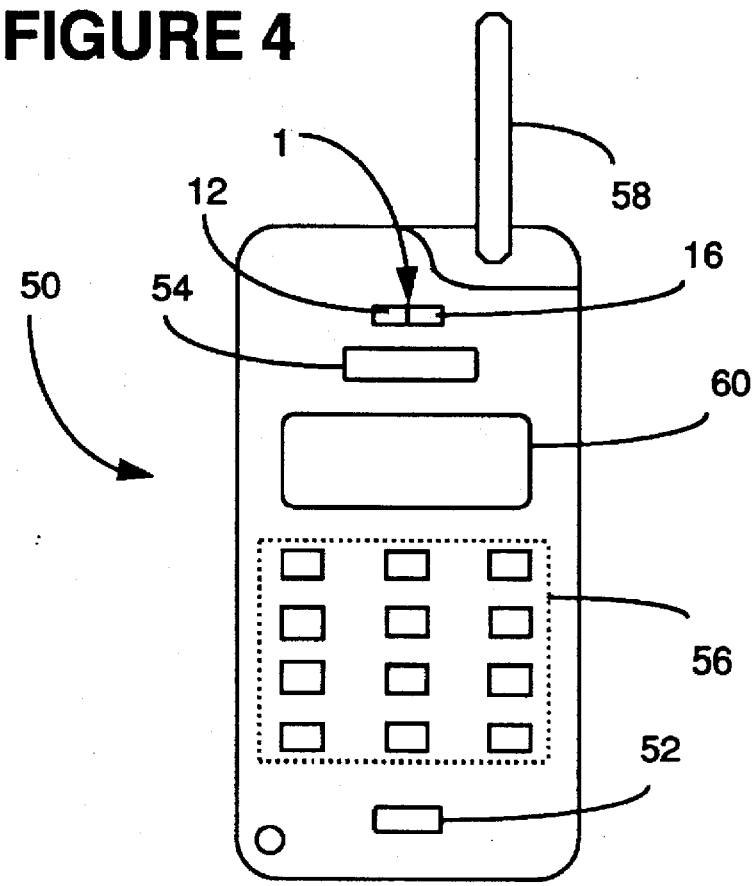
FIG. 4 illustrates generally a handset with the PALM according to the invention.

FIG. 4 illustrates generally a handset 50 representative of a portable wireless terminal for a personal communication system equipped with the PALM according to the invention. The handset of FIG. 1 is merely to illustrate elements which may be present in such terminals and is not intended to limit the scope of the invention. The handset generally includes a transmitter or microphone unit 52, a receiver unit 54 and a keypad 56. Also shown are antenna 58, and display area 60, used to display called numbers, messages, etc. In a preferred embodiment, the display area 60 is a liquid crystal display with backlighting which is activated by the PALM.

The PALM 1 is shown as being close to receiver 54. However, the location of the PALM 1 on the handset is not critical, as long as the positioning of the handset within a preset distance from the user's ear will result in switching of the terminal 50 from loudspeaker mode to the receiver mode. As seen on FIG. 4, the light emitting diode 12 and the infrared detector 16 are placed in the area where the user's ear is placed for use in the receiver mode.

In a preferred embodiment, the infrared transmitter 12 is a GaAS light emitting diode and infrared detector 16 is a Si photodiode. Other possible options for implementing the PALM can be considered, as long as the elements satisfy some practical considerations such as: the detector senses the proximity of the user's head and responds quickly enough to switch to receiver mode before the handset gets too close to the user's ear; the IR emitter and detector in combination with the associated circuitry can be accommodated within a small telephone handset; and the PALM is sufficiently inexpensive so as not to add significantly to the cost of the terminal.

It is desirable to configure the IR emitter/detector pair to sense the presence of the user's ear at approximately 25 cm. This is sufficient to provide an adjustable range of detection down to 5 cm which is a reasonably safe range. It is also assumed that the emitter does not operate in a mode whereby the IR beam poses any safety threat to the skin, eyes or ear of the user of the handset.

While the invention has been described with reference to particular example embodiments, further modifications and improvements which will occur to those skilled in the art, may be made within the purview of the appended claims, without departing from the scope of the invention in its broader aspect.

What I claim is:

1. A proximity and ambient light monitor (PALM) comprising:
   light emitting means for generating an optical composite signal;
   light detecting means for receiving a fraction of said optical composite signal and providing a detected signal;
   means for separating an ac component from said detected signal; and
   switching means for providing a control signal when said ac component is outside a preset range.

2. A PALM as claimed in claim 1, further comprising an ambient light detector for receiving said detected signal and providing an ambient light level signal.

3. A PALM as claimed in claim 1, wherein said light emitting means comprises:
   a frequency generator for generating a composite signal; and
   a light emitting diode (LED) for receiving said composite signal and producing said optical composite signal.

4. A PALM as claimed in claim 3, wherein said composite signal comprises a high frequency pulse signal modulated with a low frequency pulse signal.

5. A PALM as claimed in claim 1, wherein said light detecting means comprises a photodiode.

6. A PALM as claimed in claim 5, wherein said photodiode is connected with the anode to receive said composite signal through a resistor to ground and with the cathode to a positive bias voltage.

7. A PALM as claimed in claim 1, wherein said means for separating comprises:
   a capacitor connected to said light detecting means for passing through said ac component; and
   a filter connected in series with said capacitor for blocking the harmonics of said ac component having a frequency lower than said low frequency to provide a filtered ac signal.

8. A PALM as claimed in claim 9, wherein said switching means comprises:

an ac/dc converter for obtaining a voltage level representative of the intensity of said fraction of said optical composite signal; and a control signal generator for comparing said voltage level with said preset range and generating said control signal.

9. A PALM as claimed in claim 8, wherein said ac/dc converter comprises:

a phase switch for receiving said filtered ac signal and said composite signal, rectifying said filtered ac signal, and providing a rectified signal;

an integrator for integrating said rectified voltage to produce said voltage level.

10. A PALM as claimed in claim 8, wherein said control signal generator comprises:

a window comparator for receiving said voltage level and said preset range consisting of a minimum threshold and a maximum threshold, comparing said voltage level to said minimum threshold and said maximum threshold, and accordingly providing a low and a high level;

logic AND means for receiving said low and said high level and providing said control signal.

11. A PALM as claimed in claim 8, wherein said control signal generator comprises:

a voltage-to-frequency converter for receiving said voltage level, and providing a pulse signal of a frequency proportional to said voltage level;

a counter for receiving said pulse signal and providing a pulse count; and a numerical comparator for receiving said pulse count and said preset range consisting of a minimum threshold and a maximum threshold, comparing said pulse count to said minimum threshold and said maximum threshold, and generating said control signal.

12. A PALM as claimed in claim 8, wherein said control signal generator comprises:

a voltage/frequency converter for receiving said voltage level, and providing a pulse signal of a frequency proportional to said voltage level;

a counter for providing a pulse count for said pulse signal; and means for processing said pulse count and generating said control signal, said control signal having a ramped variation.

13. A PALM as claimed in claim 2, wherein said ambient light detector comprises:

a filter for receiving said detected signal and passing through a filtered dc signal comprising the harmonics having a frequency lower than said low frequency;

an amplifier for amplifying said filtered dc signal; and a comparator for receiving said filtered dc signal after amplification and a reference value, and providing said ambient light level signal.

14. A PALM as claimed in claim 1, in combination with a handset terminal, comprising means for providing said control signal to an audio level selector (ALS) of said handset terminal and accordingly operating said ALS in a receiver mode characterized by a low volume audio signal, and a loudspeaker mode, characterized by a high volume audio signal.

15. A PALM as claimed in claim 14, wherein said light emitting means and said light detecting means are positioned on said handset terminal such that said fraction of said optical composite signal arrives at said light detecting means whenever a light opaque obstacle is interposed in the way of said optical composite signal.

16. A PALM as claimed in claim 2, in combination with a handset terminal, comprising means for providing said control signal to an audio level selector (ALS) of said handset terminal and accordingly operating said ALS in a receiver mode characterized by a low volume audio signal, and a loudspeaker mode, characterized by a high volume audio signal, and means for receiving said ambient light level signal and operating a backlight of said handset terminal.

17. A method for detecting proximity and ambient light intensity, comprising the steps of:

generating an optical composite signal;

providing a fraction of said optical composite signal to a light detecting means, whenever a light opaque obstacle is interposed in the way of said optical composite signal;

converting said fraction of said optical composite signal to a detected signal;

separating an ac component from said detected signal; and providing a control signal when said ac component is outside a preset range.

18. A method as claimed in claim 17, further comprising the step of processing said detected signal and providing an ambient light level signal.

19. A method as claimed in claim 17, further comprising the step of maintaining said control signal for a substantially small reduction of said detected signal.

20. A method as claimed in claim 18, further comprising the step of maintaining said ambient light level signal constant for a substantially small reduction of said detected signal.

* * * * *

UNITED STATES PATENT AND TRADEMARK OFFICE
CERTIFICATE OF CORRECTION

PATENT NO.    : 5,684,294
DATED         : November 4, 1997
INVENTOR(S)   : PROXIMITY AND AMBIENT LIGHT MONITOR It is certified that error appears in the above-identified patent and that said Letters Patent is hereby corrected as shown below:

On the title page, insert item [73] Assignee: Northern Telecom Limited
Montreal, Quebec, Canada Signed and Sealed this Twenty-first Day of July, 1998

*Attest:*

BRUCE LEHMAN

*Attesting Officer*  *Commissioner of Patents and Trademarks*